D. G. SAUNDERS, Jr., DEC'D.
D. G. SAUNDERS, ADMINISTRATOR.
MOUNTING FOR HEAVY GUNS.
APPLICATION FILED DEC. 20, 1916.
1,357,478.
Patented Nov. 2, 1920.
5 SHEETS—SHEET 1.
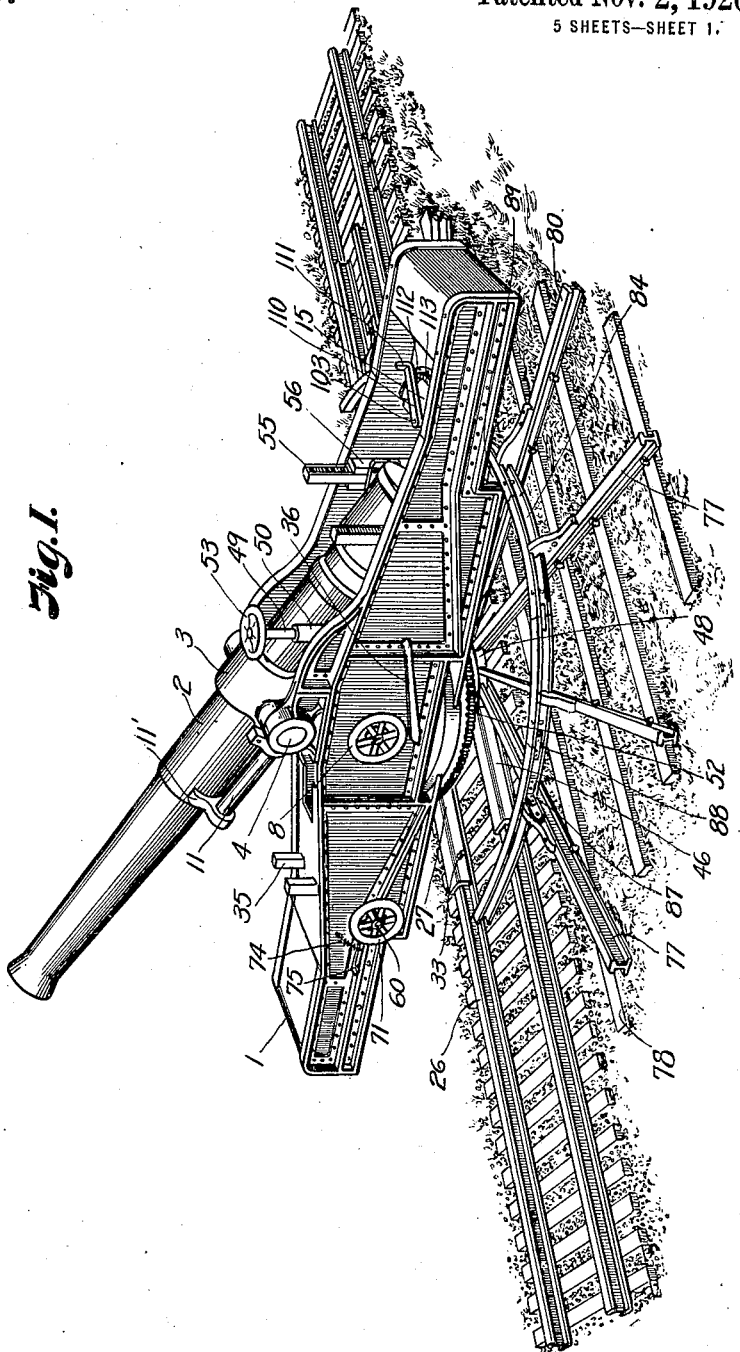
INVENTOR.
Daniel G. Saunders Jr.
BY
ATTORNEY

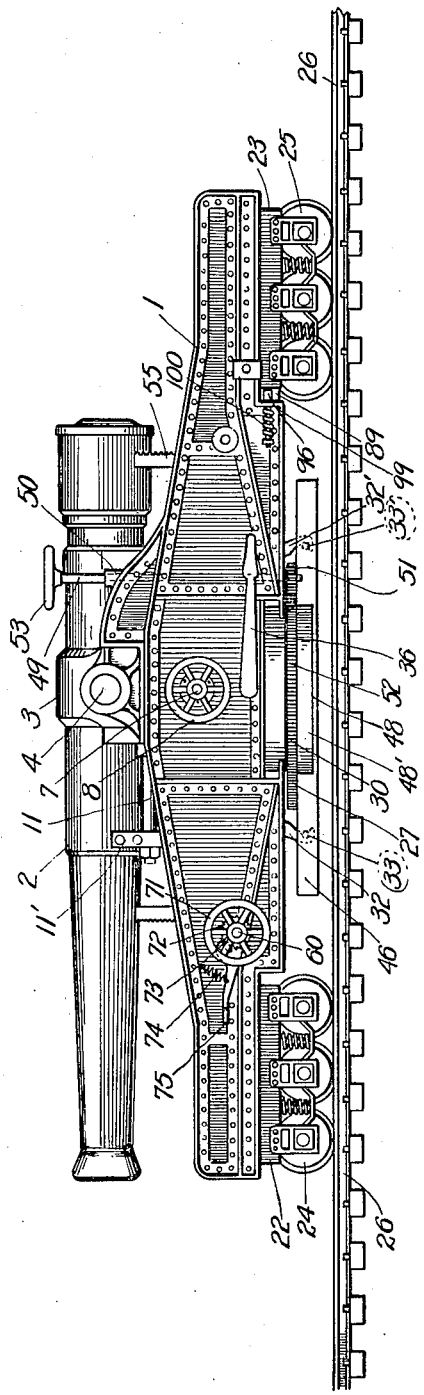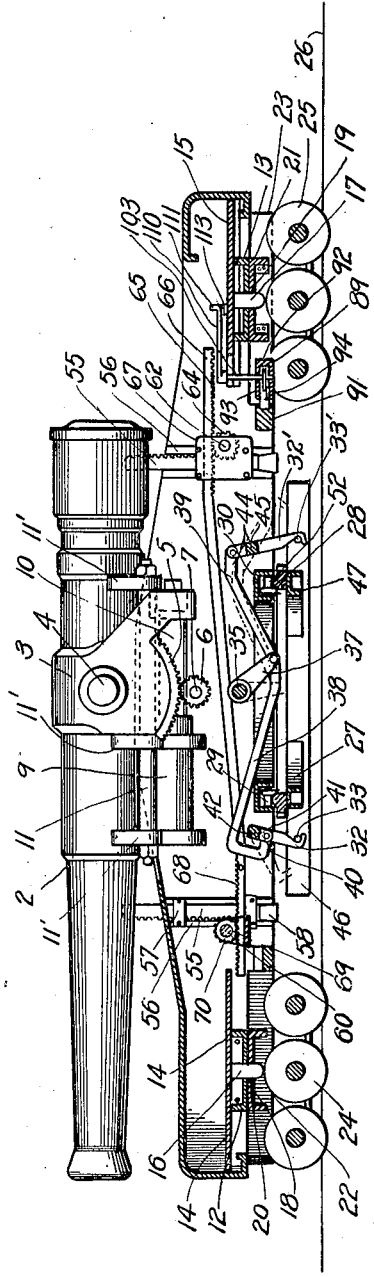

D. G. SAUNDERS, Jr., DEC'D.
D. G. SAUNDERS, ADMINISTRATOR.
MOUNTING FOR HEAVY GUNS.
APPLICATION FILED DEC. 20, 1916.
1,357,478.
Patented Nov. 2, 1920.
5 SHEETS—SHEET 3.
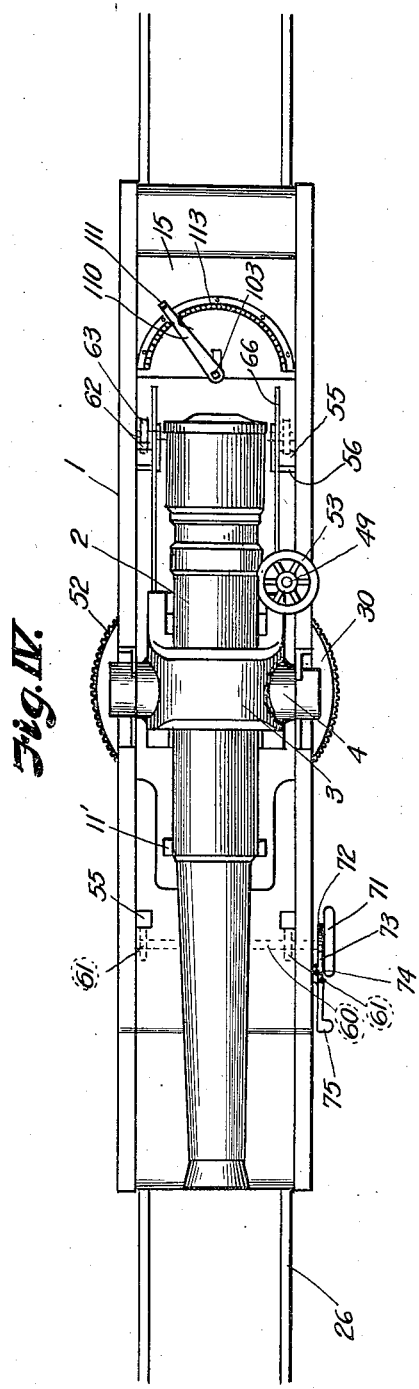
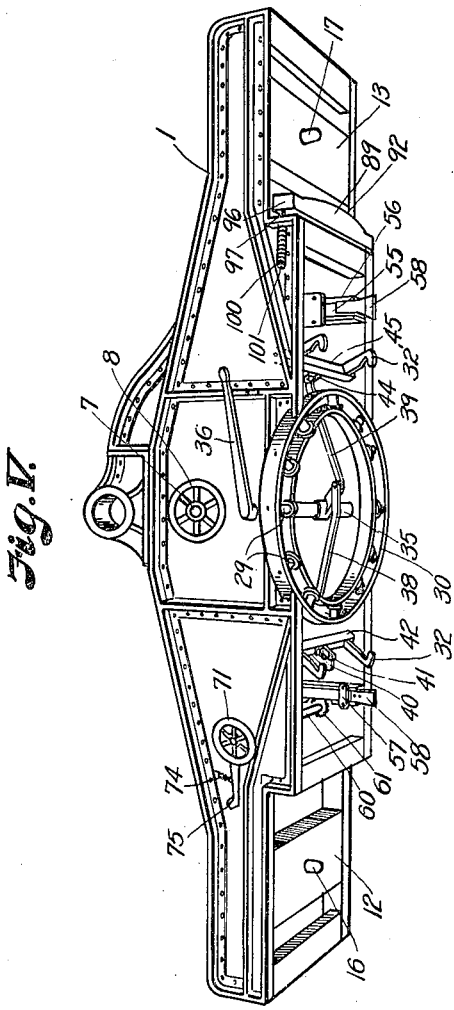
INVENTOR.
Daniel G. Saunders Jr.
BY
ATTORNEY

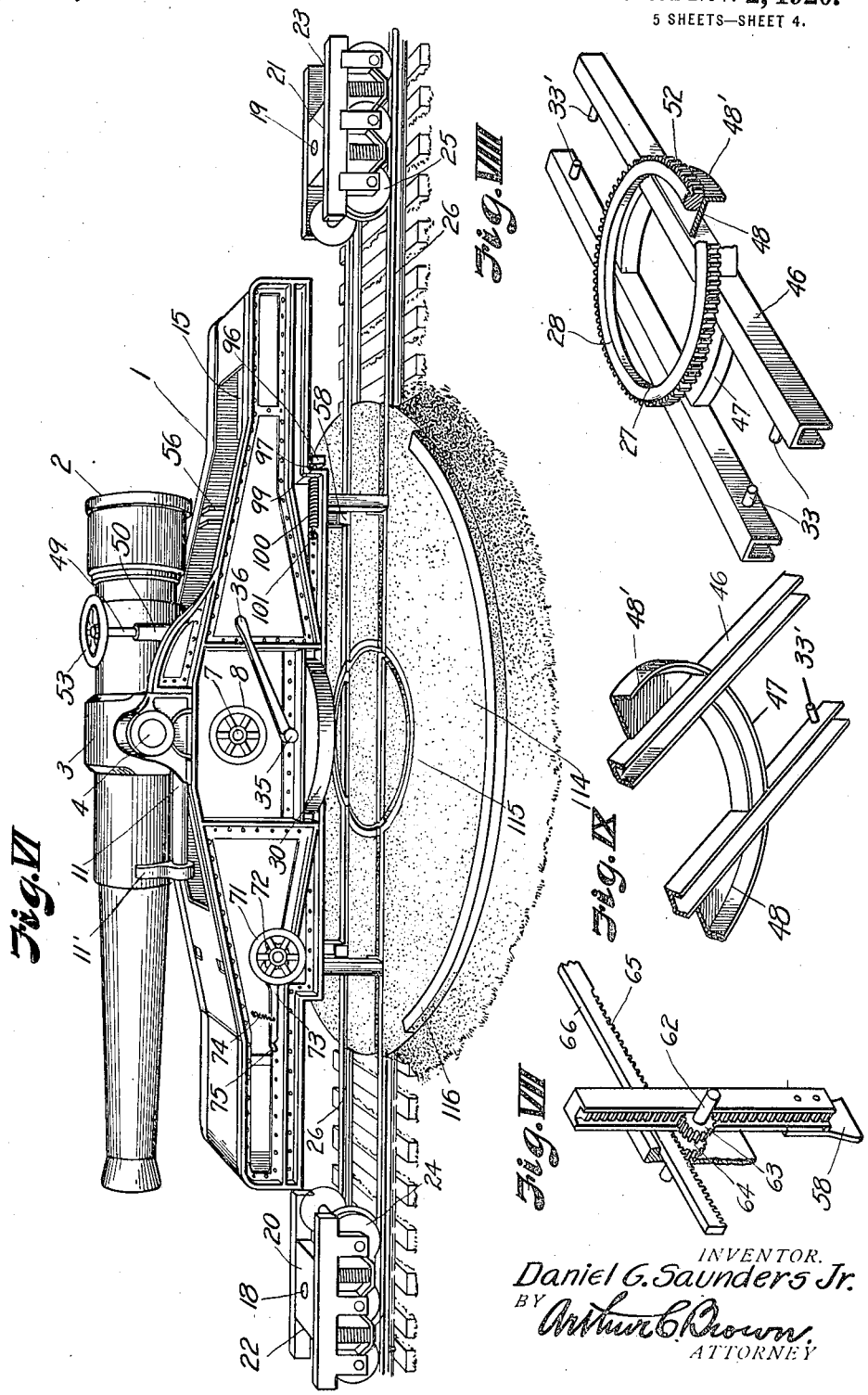

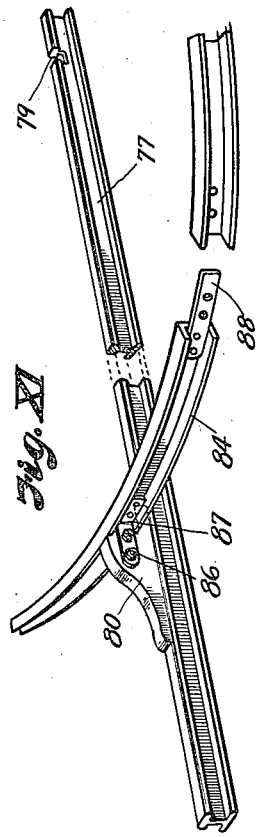
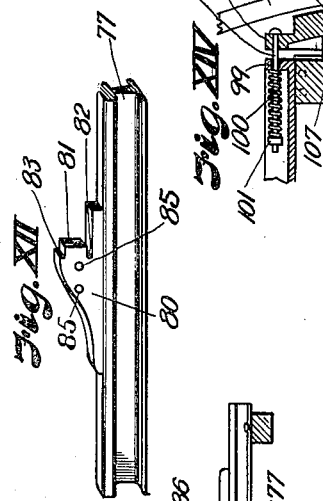
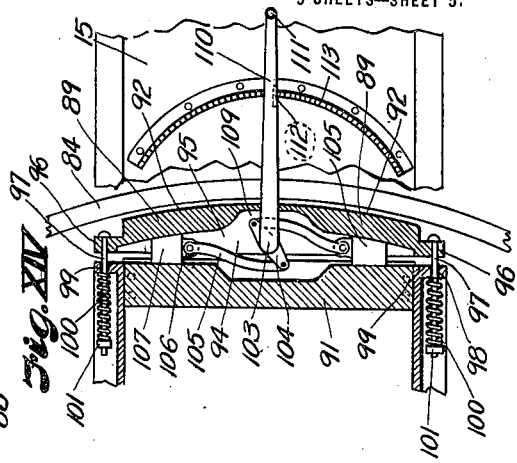
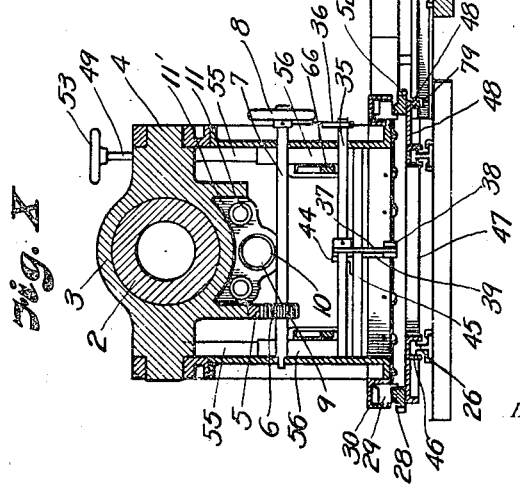
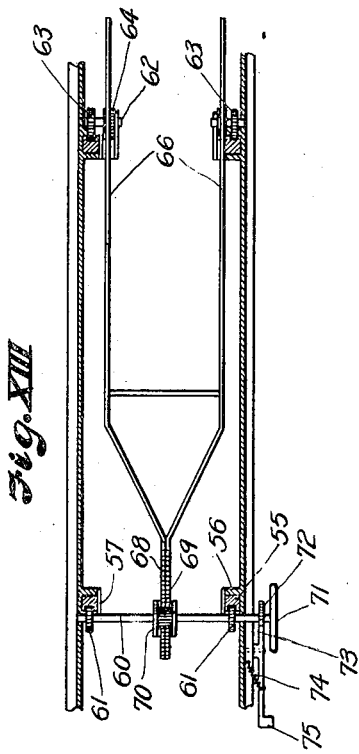

UNITED STATES PATENT OFFICE.

DANIEL G. SAUNDERS, JR., OF KANSAS CITY, MISSOURI; DANIEL G. SAUNDERS, ADMINISTRATOR OF SAID DANIEL G. SAUNDERS, JR., DECEASED, ASSIGNOR TO ARTHUR C. BROWN, OF KANSAS CITY, MISSOURI.

MOUNTING FOR HEAVY GUNS.

1,357,478.      Specification of Letters Patent.      Patented Nov. 2, 1920.

Application filed December 20, 1916. Serial No. 138,099.

*To all whom it may concern:*

Be it known that I, DANIEL G. SAUNDERS, Jr., a citizen of the United States, residing at Kansas City, in the county of Jackson and State of Missouri, have invented certain new and useful Improvements in Mountings for Heavy Guns; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to mounting for heavy guns, and has for its principal object to provide for the transportation of guns of large caliber over a railway to a point of desired use, and the rapid and substantial placement of the gun in a manner to admit of its discharging in any direction.

The invention is particularly adapted to provide defense along an extended coast line or border, and to that end I provide for the transportation of the gun on railway trucks and for the transfer thereof from the trucks to a ground foundation preferably including the rails of the railway track and braces taking the thrust of the gun to steady the same and obviate displacement or strain on the track rails.

The invention more in detail includes a platform which is removably supported from the gun carriage during the transport and may be lowered onto the railway track to form an extended foundation for the carriage or be removed from the carriage to admit of the placement of the carriage on a permanent foundation located in the track.

The invention also includes other details of structure hereinafter described and illustrated in the accompanying drawings, wherein:—

Figure I is a perspective view of a gun having a mounting, embodying my improvements and illustrating the placement of the gun in combination with a railway track.

Fig. II is a side elevation of the gun, showing it mounted on trucks for transport along a track, and, particularly, illustrating the suspension of the detachable platform.

Fig. III is a longitudinal section of the same, particularly illustrating the platform and jack mechanism.

Fig. IV is a plan view of the same.

Fig. V is an inverted perspective view of the gun carriage; the detachable platform being removed.

Fig. VI is a perspective view of the gun carriage shown in relation to a permanent foundation; the detachable platform being removed and the carriage supported on its jacks prior to lowering onto the foundation.

Fig. VII is a detail perspective view of one of the jacks.

Fig. VIII is a detail perspective view of the detachable platform.

Fig. IX is an inverted perspective view of a part of the platform; particularly showing the anchor flanges.

Fig. X is a cross-section of the gun, its carriage, including the detachable platform and the brace apparatus, and showing the platform supporting the carriage from the track rails.

Fig. XI is a detail perspective view of a part of the brace apparatus.

Fig. XII is a detail perspective view of a portion of one of the brace abutments.

Fig. XIII is a horizontal section of part of the carriage showing the jack operating mechanism.

Fig. XIV is an enlarged horizontal section of part of the carriage, particularly illustrating its brace clamp and part of a brace rail.

Referring more in detail to the drawings:

1 designates the gun carriage which may be of the ordinary construction, except for my improvements, and 2 a gun having the usual trunnion mounting in the carriage to adapt it for variable inclination; the barrel of the gun being slidably mounted in the collar 3 that carries the trunnions 4 and having an arcuate rack 5 operable by a pinion 6 having connection through a shaft 7 with a hand-wheel 8 whereby the collar may be moved to adjust the barrel on its horizontal axis. The gun is also provided with the ordinary recoil mechanism comprising a chamber 9 on the barrel 2, a piston 10 mounted in the collar 3 and working in the chamber 9, and guides 11 fixed to the barrel and slidable in sleeves 11' on said collar.

At the front and rear of the carriage 1 are cross-beams 12—13 for supporting floor members 14—15, and fixed to said cross beams and floor members are downwardly extending pins 16—17 that are adapted for projection through apertures 18—19 in cross beams 20—21 of trucks 22—23 to center the carriage on the trucks when lowered thereto in the manner presently described, and which provide a coupling between the carriage and trucks that serves to form a traveling unit of the trucks and carriage when the parts are so assembled. The trucks 22—23 have the flanged wheels 24—25 that adapt them for travel over the rails 26 of a railway track, so that the carriage may be moved along the track rapidly and safely to any desired point within the length of the track.

As it is the purpose of the invention to conduct heavy guns to points along an extended coast line or border in order to provide mobile defense or offense to an extent that would be impossible were it necessary to locate an adequate number of the guns permanently along such lines, it is necessary that a gun be temporarily placed for firing after it has been conducted to the desired point. It is readily apparent that a gun of the construction requiring a carriage of the type herein described would have no lateral range on its carriage mounting, so that while it might be fired in a line with the track it would be useless for offense or defense in any direction out of such alinement, and it is to adapt the gun for such lateral adjustment that I have devised the present invention.

It is further apparent that if there is any lateral adjustment of the gun it must be an adjustment of the carriage rather than of the gun on its carriage, and that such adjustment must be secured independently of the trucks that support the carriage on the railway track.

In securing the adjustment I therefore provide for removing the trucks and supporting the carriage from the track or a permanent foundation located in the track and for turning the carriage on such support in order to provide the adjustment desired. As the weight of the carriage and gun would not permit of ready movement of the carriage on a track or ground foundation without a roller bearing of some kind, I have provided the carriage with such bearing; the preferred embodiment thereof comprising a platform 27 (Fig. VIII) comprising the ground members and an annular track 28 adapted for engagement by the rollers 29 arranged radially in an annular inverted channel housing 30 permanently secured to and forming part of the gun carriage; the said housing being located at the center of the carriage to balance the same when supported on the platform track 28. The platform 27 is made a semi-permanent part of the gun carriage by a connection therewith through the latch hooks 32—32' which are pivotally mounted on the gun carriage at opposite sides of the channel housing and are adapted for engaging studs 33—33' on the platform 27 to suspend the platform from the carriage.

The preferred construction of the suspending mechanism comprises a transverse shaft 35 which is rotatably mounted in the side walls of the carriage and extends diametrically across the channel housing 30; one end of the shaft being provided with an operating lever 36 whereby the shaft may be turned to actuate the latch hooks.

Fixed to the shaft about the center of the housing is a crank arm 37, and pivotally connected with said arm are links 38—39 which extend in opposite directions. The link 38 is U-shaped at its outer end and comprises a back-turned ear 40 that is connected with a down-turned ear 41 on a cross bar 42 that extends across the carriage and is pivotally mounted in the sides thereof; the said cross-bar carrying at its outer ends the hooks 32 which extend from the under side of the cross bar and are adapted for taking under the studs 33 on the platform 27 to support that end of the platform. The link 39 extends oppositely to the link 38 and is connected at its free end with an ear 44 on a cross bar 45 which is also pivotally mounted in the side walls of the carriage and carries the hooks 32' which are adapted for taking under the studs 33' on the platform 27 to support that end of the platform.

It is apparent that by turning the shaft 35 as with a lever, or the like 36 in one direction the hooks may be moved apart to disconnect from the platform studs and free the platform, and that upon movement of the shaft in the opposite direction the hooks may be returned to their latch engagement with the platform studs.

As before stated it is possible to fire the gun in alinement with the track without adjusting the carriage laterally. The platform 27 in its preferred construction and to adapt it for forming a substantial foundation for the gun and its carriage, comprises ground beams 46 which carry the annular track 28 and are adapted for support on the railway track; the preferred construction of the beams and their combination with the annular track being that wherein each comprises an inverted channel of sufficient width and depth to fit over the ball of the track rail and for support on the rail base; in this way providing an extended bearing for the platform along the track rails. With this construction the beams are connected by arcuate ribs 47 and have laterally directed shelves 48 forming a continuous support for the annular track 28.

To turn the carriage on the annular platform track to position the gun I provide the carriage with a vertical shaft 49 that is rotatable in bearings 50 on the carriage and has a pinion 51 fixed on its lower end and meshing with a rack ring 52 on the periphery of the track 28; the upper end of the shaft having a hand wheel 53 whereby the shaft may be turned in its bearings to propel the carriage about on its annular support. As the carriage must be raised and lowered from and to trucks and to and from the ground support when the gun is being placed in operative position or returned to the trucks for further transport I provide for vertical movement of the carriage by locating jacks at suitable points thereon. The preferred jack construction comprises vertical standards 55 which are slidably mounted in vertical guides 56 fixed to the side walls of the gun carriage at suitable positions relative to the center of gravity, and adapted for simultaneous operation to raise and lower the carriage horizontally; the guides 56 preferably comprising spaced battens within which the standards may move and are confined by keeper plates 57 that retain the standards in the guides without interfering with their free movement.

The standards 55 are preferably arranged to seat on the track rails 26 and have side shoes 58 projecting downwardly beyond their ends to lie along the sides of the rails and hold the standards to their positions thereon.

To raise and lower the standards simultaneously I provide the transverse shaft 60 that is rotatably mounted in the side walls of the carriage adjacent one pair of standards and fixed pinions 61 on said shaft in meshing relation with relative jack standards so that when the shaft is revolved the standards are raised and lowered.

Rotatably mounted in a side wall of the carriage, and in plates 67 that are carried on the guide battens 56 of the opposite pair of jack standards, are stub shafts 62, each carrying a pinion 63 in mesh with the corresponding jack standard, and also carrying a pinion 64 which meshes with a rack 65 on the under edge of a bar 66 that extends longitudinally within the carriage; the said bars 66 being brought together adjacent the shaft 60 and extended thereunder at the center of the shaft. The upper edges of the side-lapping portions of the bars 66 are provided with racks 68 which mesh with a pinion 69 that is fixed on the shaft 60; the said ends being supported and held in mesh with the pinion 69 by a bracket 70 that is suspended from the shaft.

It is apparent that with this arrangement when the shaft 60 is rotated in one direction it will operate one pair of the jack standards directly through its pinions 61 and the other pair of jack standards indirectly, but in the same direction, through the rack bars 66.

As a means for operating the shaft 60 to raise or lower the jack standards, I have shown the shaft provided with a wheel 71 and with a ratchet 72 for taking a pawl 73 that is pivotally mounted on the side wall of the carriage, and provided with a spring 74 for yieldingly retaining the pawl in engagement with the ratchet to lock the shaft, and with a handle 75 for moving the pawl against the tension of its spring to unlock the shaft.

As previously stated, while a heavy gun may be discharged in alinement with the track with accuracy and without damage to the track or carriage, it is essential that the gun have adjustment laterally, and in order to adapt it for firing at such laterally variable angles it is necessary to provide the supplemental supports and braces for taking the recoil thrust.

As a preferred means for accomplishing this result I provide the brace rails 77 which are adapted for support on beams 78 along the sides of the track, and each having a socket 79 in its upper edge adjacent one end to fit under the depending ear 48' of a shelf 48 to anchor the base rails to the track upon which the gun is supported.

Each of the rails 77 is provided with a brace block 80 which may be formed integrally with or rigidly secured on the top of the rail and comprises a head 81 at one end having upper and lower seats 82—83 for receiving the flanges of an arcuate base rail 84 and having apertures 85 through which bolts 86 may be extended to attach a connecting bar 87, that is preferably secured on the arcuate rail, to the brace block.

With this arrangement a number of the brace rails may be extended radially from the platform 27 and as the rails are all anchored to the platform the brace blocks are arranged concentrically to receive the arcuate rails 84 which, when assembled, form a circular abutment for a corresponding part on the gun carriage. There may be any suitable number of sections in the abutment according to the horizontal range it is desired to give the gun, and these individual sections are preferably rigidly connected when in place by strips 88 that extend from the ends of some of the sections along other sections and may be bolted or otherwise rigidly secured thereto.

In order to fix the gun carriage in an adjusted position I provide a friction clamp head 89 which lies along the breech end of the carriage and extends rearwardly from a beam 91 on the carriage beneath the plane of the supporting floor member 15. The head 89 comprises a contact body having a bearing surface 92 having the same curvature as the arcuate abutment, so that it may fit snugly thereagainst, rearwardly projecting flanges 93—94 forming an intermediate chamber 95 and end lips 96. Mounted in the end lips 96 are rods 97 which extend slidably through apertures 98 in flanges 99 on the end of the body part of the gun carriage and carry compression springs 100 which abut against the flanges 99 and are retained by nuts 101 on the inner ends of the rods to yieldingly retain the clamp head 89 inwardly while permitting it to move outwardly to engagement with the abutment.

To move the clamp head against the tension of said springs I provide a shifting mechanism comprising a shaft 103 which is rotatably mounted at the center of the head and in the flanges 93—94.

Fixed on the shaft 103 is a cross-head 104, and pivotally connected with the ends of the cross-head are links 105; the opposite ends of which are pivotally connected with ears 106 on wedge-blocks 107 that are adapted for movement between the beam 91 and the clamp head 92 to move the head outwardly against the tension of the springs 100 when the links are extended and to return the blocks and allow the clamp head to move back under tension of its springs when the links are retracted. The head 89 is provided with an incut recess 109 to receive the outstanding portion of the cross-head 104 and the link which is attached hereto. The cross head shaft 103 is provided with an operating lever 110 having a handle portion 111, and is provided on its under surface with a pawl tooth 112 that operates on a sector ratchet 113 to retain the lever in set position and effect the brake contact of the clamp head 89 with the face of the abutment rail when the gun carriage is in adjusted position.

While the foundation just described may be placed at any point along the track over which the carriage may be conducted, it may be desirable to effectually support the carriage in a substantial manner, to locate foundation at strategic points to facilitate functional placement of the carriage and afford a rapid and firm support therefor. Such a foundation 114 (Fig. VI) may be constructed of concrete and comprise an inset and circular track 115 corresponding to the track 28 on the semi-permanent foundation 27. With the permanent foundation the abutment rail 116 may be made continuous and permanently set in the concrete.

In using the apparatus, assuming the parts to be constructed and assembled as described, the gun and its carriage, including the suspended foundation, may be mounted on the railway trucks and conducted along the track to a point of use. When such point is reached, the jack standards 55 are lowered by manipulation of the mechanism heretofore described until their base ends rest on the track rails. Further operation of the jacks then lifts the gun and its carriage from the trucks and the trucks are removed (Fig. VI). When the trucks are removed the jacks are operated in reverse direction to lower the carriage onto the track, so that the carriage is supported on the annular track 28 and may be turned laterally for the horizontal range, the length of the beams 46 providing an extended bearing along the track that will provide such substantial bearing for the carriage that any strain due to the weight of the carriage and recoil thrust is absorbed by a substantial length of the track; particularly when the beams are of the channel form and bear on the track rails.

When the gun is no longer required at that point it may be again jacked up, the trucks replaced, and the gun and its carriage conducted to another point of use.

When a substantial horizontal range is required the mode of operation is somewhat different in that after the semi-permanent foundation 27 has been lowered onto the track the radial brace rails 77 are placed and the annular abutment located on and attached to the brace rails.

When the parts are set, the carriage is turned to the desired angle and the clamp head 89 forced against the abutment to lock the carriage in set position.

While I have shown a definite extent and arrangement of the brace rails and abutment, as well as a definite combination of the semi-permanent foundation with the track, such should not be considered a limitation of the invention but merely illustrative. Should the gun be required at a point where a permanent foundation is provided the mode of operation is still different in that after the carrying trucks have been removed the carriage is lowered to locate the semi-permanent foundation 27 on the track, the foundation released from the carriage by operation of the hook mechanism, the carriage raised by the jacks to free the foundation, the foundation removed, and the carriage again lowered to locate the roller bearings of the carriage onto the annular track 115 in the permanent foundation 114. The carriage may then be turned to the desired angle and locked in place by contact of the clamp head against the fixed annular abutment 116. The operation just described is reversed to relocate the carriage on the carrying trucks when the gun and carriage are to be conducted to another point.

It is apparent that with the apparatus herein described, an extended line of coast or border may be defended with a minimum investment in equipment, as a gun may be carried over a railway track paralleling the coast or border line to a point of use and the position shifted as may be required; the placement of the gun on the permanent or temporary foundation being effected rapidly after the gun has reached the point of use.

Having thus described my invention, what I claim as new therein, and desire to secure by Letters-Patent, is:—

1. In combination with a gun carriage, a platform comprising spaced, longitudinal beams, a bearing member carried on said beams, a bearing member on the carriage coöperative with that on the platform, studs on said beams, and hooks on the carriage detachably engaging the studs to suspend the platform.

2. In combination with a gun carriage having a bearing member thereon, a platform having a bearing member coöperative with that on the carriage, cross-bars pivotally mounted on the carriage at opposite sides of the bearing member, hooks on said bars adapted for detachably engaging the platform to suspend the same, ears extending downwardly and upwardly respectively from the separate cross-bars, links connected with said bars, and a single operating mechanism for both of said links.

3. In combination with a gun carriage having a bearing member thereon, a platform having a bearing member coöperative with that on the carriage, cross-bars pivotally mounted in the carriage at opposite sides of the bearing member, hooks on said bars adapted for detachably engaging the platform to suspend the same, ears extending downwardly and upwardly respectively from the separate cross-bars, a link extended over and back of the bar having the depending ear and having a back-turned portion connected therewith and a link connected with the ear on the other cross-bar, and single means for actuating said links.

4. In combination with a gun carriage, a platform comprising beams of inverted channel construction, spaced to fit over the rails of a railway track.

5. In combination with a gun carriage, a platform comprising beams of inverted channel construction, spaced to fit over the rails of a railway track, and coöperative bearings on the carriage and platform.

6. In combination with a gun carriage, a platform comprising beams of inverted channel construction, spaced to fit over the rails of a railway track, and means for suspending the platform from the carriage.

7. In combination with a gun carriage, a ground member for rotatably supporting the carriage, an annular abutment, a clamp head on the carriage, yielding means for retaining the clamp head in non-functional position, and means for moving the clamp head to contact with the abutment against the tension of said yielding means.

8. In combination with a gun carriage, a ground member for rotatably supporting the carriage, a circular abutment, a clamp head slidably mounted on the carriage and having a bearing face curved to the contour of the abutment, and means for actuating the clamp head to effect contact thereof with the abutment.

9. In combination with a gun carriage, a ground member for rotatably supporting the carriage, an annular abutment, a clamp head on the carriage, yielding means for retaining the clamp head in non-functional position, wedge blocks engaging the clamp head, and lever mechanism for actuating the wedge blocks to force the clamp head to engagement with the abutment.

10. In combination with a gun carriage, a cross beam, a clamp head mounted on the carriage and movable toward and from the carriage, a cross-head pivotally mounted on the clamp head, links connected with the cross-head, wedge-blocks connected with said links and engaging the cross-beam and clamp-head, and lever mechanism for actuating the cross-head.

11. In combination with a gun carriage, a cross beam, a clamp head mounted on the carriage and movable toward and from the carriage, a cross-head pivotally mounted on the clamp head, links connected with the cross-head, wedge blocks connected with said links and engaging the cross beam and clamp head, mechanism for actuating the cross head comprising a lever, and a tooth sector on the carriage for holding the lever.

12. In combination with a gun carriage, a cross-beam, an abutment, a clamp-head mounted on the carriage and movable toward and from the carriage, a cross-head pivotally mounted on the clamp-head, links connected with the cross-head, wedge blocks connected with said links and engaging the cross-beam and clamp-head, lever mechanism for actuating the cross-head, and springs for resisting movement of the clamp-head toward the abutment and returning said head.

13. In combination with a gun carriage, temporary platform rails, each having a brace block thereon, a base rail mounted on the platform rails, and a clamp head on the carriage in coöperative relation to the base rail.

14. In combination with a gun carriage, temporary platform rails, each having a brace block thereon, a sectional base rail mounted on the platform rails and bearing against said brace blocks, means connecting the base rail sections, and means connecting the base sections with the brace blocks.

15. In combination with a gun carriage, having a bearing member thereon, a platform having a bearing member coöperating with the member on said carriage to rotatably support the carriage, anchor members on said platform, platform rails connected with said anchor members, a base rail mounted on the platform rails, and a clamp head on the carriage for engaging the base rail.

16. In combination with a gun carriage and a railway track, a platform arranged at the side of the track and comprising a brace rail, a clamp block slidable on the carriage and adapted for engaging said rail, wedge blocks slidable on the carriage and having operative relation with the clamp block and means for operating the wedge blocks.

17. In combination with a gun carriage and a railway track, an auxiliary platform for supporting the gun carriage from the track, rails radiating from said platform and means supported by said rails for bracing a gun carriage having support on the platform.

18. In combination with a platform comprising a circular rail adapted for rotatably supporting a gun carriage, a series of spaced ground beams, a plurality of rails supported on said beams and radiating from the circular platform rail and a brace rail supported on said radiating rails.

19. In combination with a platform, comprising a circular rail for rotatably supporting a gun carriage, a brace rail concentric with the platform rail, a gun carriage rotatably supported on the circular rail and means for bracing the gun carriage from the concentric rail.

20. In combination with a platform comprising spaced beams and a circular, vertical side flange, radial rails having inner ends anchored to said flange, and a brace rail supported on said radial rails.

21. In combination with a platform, comprising a down-set, circular flange and a circular rail supported on the platform and flange, radial rails having sockets at their inner ends receiving said flange to anchor the rails, means supported on said radial rails for providing a brace for a carriage supported on said circular rail, and a gun carriage supported on said circular rail, and braced from said means on the radial rails.

22. In combination with a platform comprising a circular rail for rotatably supporting a gun carriage, a brace rail concentric with the platform rail, a gun carriage rotatably supported on the circular rail and means for bracing the gun carriage from the concentric rail.

23. In combination with a platform comprising spaced beams and a circular, vertical, side flange, an annular rail supported on said beams and flange, radial rails having inner ends anchored to said flange, and a brace rail supported on said radial rails.

In testimony whereof I affix my signature.

DANIEL G. SAUNDERS, JR.